(12) United States Patent
Dickens et al.

(10) Patent No.: US 11,922,637 B2
(45) Date of Patent: Mar. 5, 2024

(54) TESTBED PLATFORM FOR CHARACTERIZATION OF MATERIALS AND INKS USED IN ADDITIVE MANUFACTURING OF NANOCOMPOSITES

(71) Applicant: Florida A&M University, Tallahassee, FL (US)

(72) Inventors: Tarik J. Dickens, Tallahassee, FL (US); Madhuparna Roy, Tallahassee, FL (US); Phong Tran Hoang, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 352 days.

(21) Appl. No.: 17/487,658

(22) Filed: Sep. 28, 2021

(65) Prior Publication Data

US 2022/0105514 A1    Apr. 7, 2022

Related U.S. Application Data

(60) Provisional application No. 63/086,619, filed on Oct. 2, 2020.

(51) Int. Cl.
*G06T 7/00*         (2017.01)
*B33Y 99/00*      (2015.01)
(Continued)

(52) U.S. Cl.
CPC ............... *G06T 7/20* (2013.01); *B33Y 99/00* (2014.12); *G01N 15/1404* (2013.01);
(Continued)

(58) Field of Classification Search
CPC ....... G03F 7/0002; B82Y 10/00; B82Y 40/00; B82Y 30/00; G06T 7/20; G06T 7/0004; G06T 7/70; G06T 2207/20056; B33Y 99/00; B33Y 30/00; B33Y 40/00; G01N 15/1404; G01N 15/1459; G01N 21/85;
(Continued)

(56) References Cited

U.S. PATENT DOCUMENTS 9,383,355 B2 * 7/2016 Sasso, Jr. .......... B01L 3/502761
2011/0306081 A1 * 12/2011 Szita ...................... C12M 23/26
435/395
2020/0129981 A1 * 4/2020 Mao .......................... B03C 1/32

\* cited by examiner

*Primary Examiner* — Eric S. McCall
*Assistant Examiner* — Timothy P Graves
(74) *Attorney, Agent, or Firm* — Greenberg Traurig, LLP

(57) ABSTRACT

Various embodiments are directed to a testbed platform for characterizing materials and inks utilized in additive manufacturing of nanocomposites. The system may include a testbed base coupled to a group of electromagnets. The base may include an aperture for housing a microscope slide and an interchangeable channel including a microfluidic flow cell of various geometric angles. The system may further include a group of needle tips in fluidic communication with the microfluidic flow cell. The needle tips may be coupled, via lock connectors, to syringes that dispense magnetic inks utilized in additive manufacturing into the microfluidic flow cell. The system may also include an inverted microscope lens and a high-speed camera in optical communication with the base. The camera may be utilized to capture images of a flow behavior of the magnetic inks for performing an analysis that determines a nozzle design for microdispensing during an additive manufacturing process.

19 Claims, 3 Drawing Sheets

(51) Int. Cl.
  *G01N 15/14*   (2006.01)
  *G01N 21/85*   (2006.01)
  *G06T 7/20*   (2017.01)
  *G06T 7/70*   (2017.01)
  *B33Y 30/00*   (2015.01)

(52) U.S. Cl.
  CPC ......... *G01N 15/1459* (2013.01); *G01N 21/85* (2013.01); *G06T 7/0004* (2013.01); *G06T 7/70* (2017.01); *B33Y 30/00* (2014.12); *G06T 2207/20056* (2013.01)

(58) Field of Classification Search
  CPC ....... B01L 2300/0877; B01L 2400/043; B01L 3/502715; B01L 9/527; G02B 21/34
  See application file for complete search history.

TESTBED PLATFORM FOR CHARACTERIZATION OF MATERIALS AND INKS USED IN ADDITIVE MANUFACTURING OF NANOCOMPOSITES

CROSS REFERENCE TO RELATED APPLICATION

This application claims the benefit of U.S. Provisional Application No. 63/086,619, filed Oct. 2, 2020, the disclosure of which is incorporated, in its entirety, by this reference.

BACKGROUND

Additive manufacturing (also known as three-dimensional or 3D printing), is the construction of a three-dimensional object from a CAD model or a digital 3D model. The term 3D printing may refer to a variety of processes in which material is deposited, joined or solidified under computer control to create a three-dimensional object, with material being bonded together (such as liquid molecules or powder grains being fused together), typically layer by layer.

In some additive manufacturing processes, such as material extrusion, utilizing conventional convergent printheads (i.e., nozzles that taper into a fine point), the bonding of successive microstructure layers may often be problematic, particularly along the Z-axis direction in a three-dimensional coordinate system. For example, convergent printheads may often not allow for the depositing of sufficient material to create strong bonds leading to poor layer integrity. Furthermore, conventional convergent printheads result in increased shear forces at the point of convergence resulting in potentially compromised strength in 3D printed parts.

SUMMARY

As will be described in greater detail below, the instant disclosure generally relates to a testbed platform for characterizing materials and inks utilized in additive manufacturing of nanocomposites. In one example, the system may include a base having a top surface, a bottom surface, and a pair of opposing sidewalls. At least a portion of the top surface and the bottom surface may form an aperture that receives light rays. The system may further include a group of electromagnets coupled to the opposing sidewalls of the base, a microscope slide seated in the aperture formed by the top surface and the bottom surface of the base, an interchangeable channel including a microfluidic flow cell coupled to the microscope slide, and a group of needle tips in fluidic communication with the microfluidic flow cell.

In some examples, a first needle tip in the group of needle tips may be coupled to a syringe inlet via a lock connector and may be configured to receive magnetic inks utilized in additive manufacturing from a syringe for dispensing into the microfluidic flow cell. In some examples, a second needle tip in the group of needle tips may be coupled to a syringe outlet via another lock connector and may be configured to pull the magnetic inks from the microfluidic flow cell into a reservoir.

In some examples, the system may further include an inverted microscope lens in optical communication with the base, the microscope slide, and the microfluidic flow cell. The system may additionally include a high-speed camera coupled to the inverted microscope lens. The high-speed camera may utilized to capture images of a flow behavior of the magnetic inks dispensed into the microfluidic flow cell for performing an analysis that determines an optimal nozzle design for microdispensing the magnetic inks during an additive manufacturing process.

In some examples, the interchangeable channel including the microfluidic flow cell may have a 15-degree divergence angle, a 30-degree divergence angle, or a 45-degree divergence angle. In some embodiments, the interchangeable channel including the microfluidic flow cell may be formed from a silicone-based organic polymer (e.g., polydimethylsiloxane (PDMS)).

In some examples, the magnetic inks may be thermoset composite inks loaded with magnetic nanoparticles. In some embodiments, the electromagnets may have a variable field strength and apply an external magnetic field to the magnetic nanoparticles.

In some examples, the analysis that determines the optimal nozzle design for microdispensing the magnetic inks during the additive manufacturing process may include determining one or more of a flowrate, pressure, and a magnetic nanoparticle alignment in a flow of the magnetic inks dispensed into the microfluidic flow cell. Additionally or alternatively, the analysis may include performing a fast Fourier transform image analysis to determine a degree of orientation magnetic nanoparticles in flow of the magnetic inks dispensed into the microfluidic flow cell. Additionally or alternatively, the analysis may include capturing images (utilizing the high-speed camera) showing a response of magnetic nanoparticles to a magnetic field applied by the electromagnets during a flow of the magnetic inks into the microfluidic flow cell. In some examples, the response of the magnetic nanoparticles to the magnetic field may include a determination of vorticity and velocity with respect to the magnetic nanoparticles.

In some embodiments, the optimal nozzle design for microdispensing the magnetic inks during the additive manufacturing process may include a divergent nozzle design configured to control fiber orientation during the additive manufacturing process with a composite material, thereby reducing shear forces at a divergence point associated with the nozzle.

In some examples, a system for characterizing materials and inks utilized in additive manufacturing of nanocomposites may include the testbed platform described above and a divergent nozzle apparatus, based on the optimal nozzle design. The divergent nozzle apparatus may include a variable angled nozzle that provides rotational forces for an alignment of particles during the additive manufacturing process, a primary magnetic device that provides an initial alignment of magnetic particles in the magnetic inks during the additive manufacturing process, a secondary magnetic device, coupled to the variable angled nozzle, that provides a secondary alignment of magnetic particles in the magnetic inks during the additive manufacturing process, and a connecting member (e.g., a Luer lock body apparatus) that connects a housing containing the primary magnetic device to a housing containing the variable angled nozzle.

In some examples, the variable angled nozzle may have a 15-degree angle, a 30-degree angle, or a 45-degree angle. In some embodiments, the primary and secondary magnetic devices may include permanent or electromagnets.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

Figure 1:
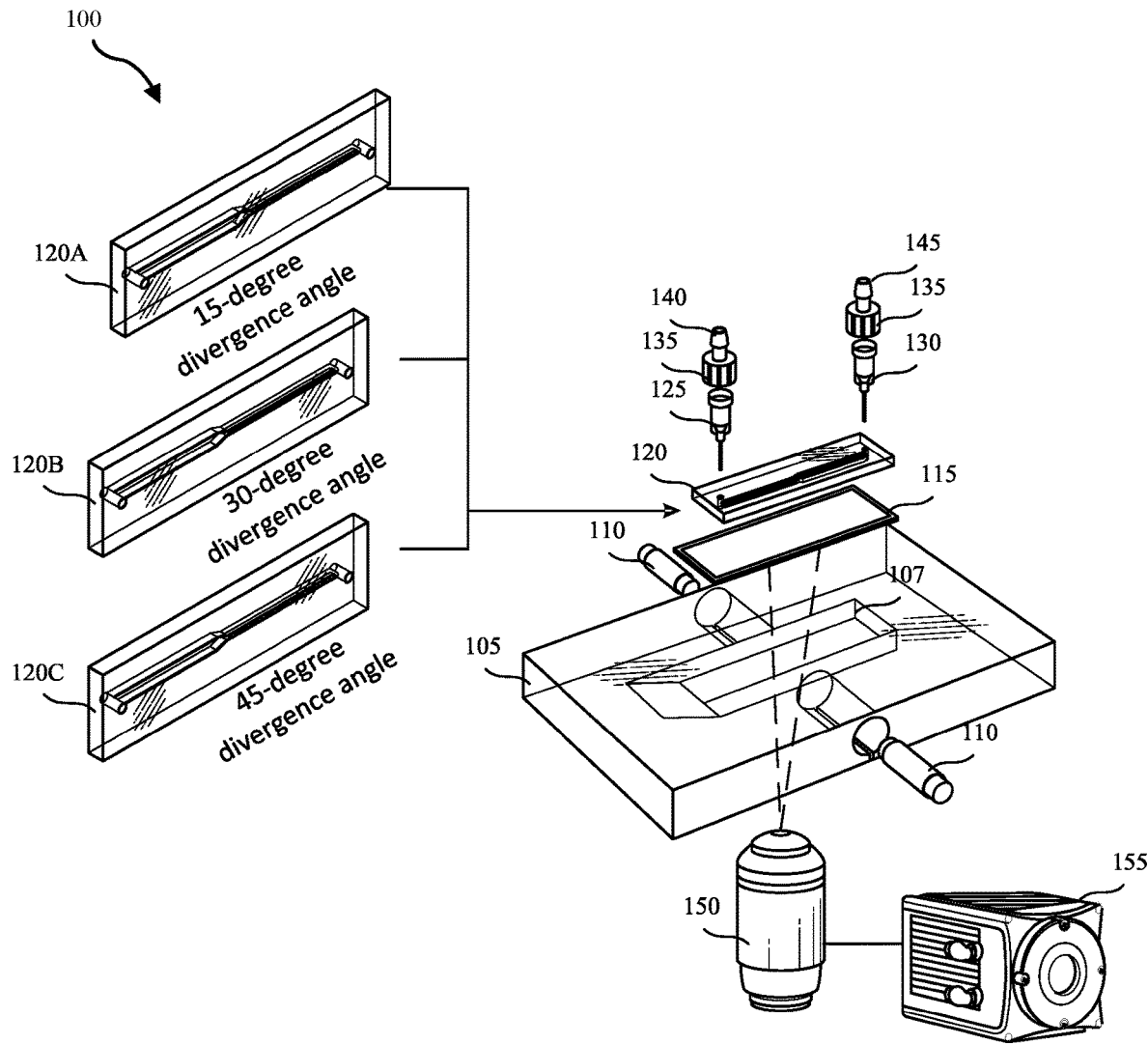
FIG. 1 illustrates an exemplary testbed platform for characterizing materials and inks utilized in additive manufacturing of nanocomposites, according to an example embodiment.

The present disclosure is generally directed to a modular testbed setup including a testbed (i.e., a 3D magneto printhead) based on microfluidic cells for the study of material properties of thermoset composites for use in additive manufacturing. In some embodiments, the modular testbed setup may allow for interchangeable microfluidic flow cells with custom geometry to mimic an additive manufacturing process under study. In some embodiments, the modular testbed setup may allow for the study of the flow behavior of thermoset composite inks to determine ideal flowrate, pressure, particle alignment in flow to perfect the composition before it can be used in a microdispensing tool. In some embodiments, the testbed may include a pair of electromagnets having a variable field strength for the application of an external magnetic field for inks loaded with magnetic nanoparticles for in-situ characterization of magnetic inks. The response of these particles in the form of vorticity and velocity, to the applied field and during the flow, may then be imaged and studied. A Fast Fourier Transform image analysis may also enable the study of the degree of orientation of particles in the flow. In some embodiments, the testbed may also enable the creation of a database of materials and inks that may be used in additive manufacturing.

In some embodiments, the testbed may have a divergent nozzle design (based on channel geometries) that may be implemented for the control of fiber orientation during the process with a composite material. Advantages of the divergent nozzle design disclosed herein include the use of a divergent structural tip/nozzle/orifices instead of a conventional converging nozzle thereby allowing for the reduction of shear forces at the point of divergence and further allowing for fiber orientation manipulation with the application of an external energy source, such as a magnetic field, in conjunction with the use of magnetic one-dimensional and two-dimensional (e.g., 1D/2D) materials including, without limitation, fibers, rods, plates, etc.

In some embodiments, a testbed flow cell may mimic the geometry of the internal structure of a nozzle used in additive manufacturing or microdispensing. The testbed flow cell may be used as a characterization tool to study the behavior of inks in a flow, in different nozzle geometries, and/or applied external magnetic fields. When an independent divergent nozzle is used in printing viscoelastic inks with fiber fillers, fiber orientation may be controlled while printing to enable customization of localized microstructure within a 3D print, which may impart improved mechanical properties or electrical properties based on the fiber orientation and application thereof.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates an exemplary testbed platform 100 for characterizing materials and inks utilized in additive manufacturing of nanocomposites. As shown in FIG. 1, testbed platform 100 may include a testbed base 105 that is coupled to electromagnets 110. In some examples, electromagnets 110 may have a variable field strength and apply an external magnetic field to magnetic nanoparticles in inks utilized in an additive manufacturing process. In one embodiment, electromagnets 110 may be capable of generating an 80 milliTesla (mT) magnetic field. In some examples, the magnetic field may act on a magnetic additive (e.g., iron oxide, nickel nanowires, ferromagnetic or paramagnetic material) added to polymer material utilized in additive manufacturing.

In some examples, testbed platform 100 may also include an aperture 107 that may retain a microscope slide 115 and an interchangeable channel 120 that includes a microfluidic flow cell that may be seated on microscope slide 115. In some examples, interchangeable channel 120 may consist of one of a number of different microfluidic flow cells 120A, 120B, and 120C, each having a different divergence angle representing a geometric angle of a nozzle that may be utilized in additive manufacturing and/or microdispensing. For example, microfluidic flow cell 120A may have a 15-degree divergence angle, microfluidic flow cell 120B may have a 30-degree divergence angle, and microfluidic flow cell 120C may have a 45-degree divergence angle. In some embodiments, interchangeable channel 120 may be formed from a silicone-based organic polymer layer (such as Polydimethylsiloxane (PDMS)).

In some examples, testbed platform 100 may also include needle tips 125 and 130. In some embodiments, needle tip 125 may be coupled to a syringe inlet 140 via a lock connector 135 (e.g., a Luer lock connector) and needle tip 130 may be coupled to a syringe outlet 145 via another lock connector 135. In some examples, needle tip 125 may be configured to receive magnetic inks utilized in additive manufacturing for dispensing into interchangeable channel 120 (e.g., one of microfluidic flow cells 120A, 120B, or 120C). Additionally, needle tip 130 may be configured to pull the magnetic inks from interchangeable channel 120 (e.g., one of microfluidic flow cells 120A, 120B, or 120C) into a reservoir. In some examples, the magnetic inks may be thermoset composite inks loaded with magnetic nanoparticles.

In some examples, testbed platform may further include an inverted microscope lens 150 positioned below base 105 for passing light rays (e.g., from a high-speed camera 155) through microscope slide 115 and interchangeable channel 120 for analyzing dispensed magnetic inks from needle tip 125. In some examples, high-speed camera 155 may be coupled to inverted microscope lens 150 and utilized to capture images of a flow behavior of the dispensed magnetic inks for performing an analysis that determines an optimal nozzle design for microdispensing the magnetic inks during an additive manufacturing process.

In some examples, the analysis may include determining one or more of a flowrate, pressure, and a magnetic nanoparticle alignment in a flow of the dispensed magnetic inks. Additionally or alternatively, the analysis may include performing a fast Fourier transform image analysis to determine a degree of orientation magnetic nanoparticles in the flow of the dispensed magnetic inks. Additionally or alternatively, the analysis may include capturing images (utilizing high-speed camera 155) showing a response of magnetic nanoparticles to a magnetic field applied by electromagnets 110 during a flow of the magnetic inks. In some examples, the response of the magnetic nanoparticles to the magnetic field may include a determination of vorticity and velocity with respect to the magnetic nanoparticles.

In some embodiments, the optimal nozzle design for microdispensing the magnetic inks during the additive manufacturing process may include a divergent nozzle design configured to control fiber orientation during the additive manufacturing process with a composite material, thereby reducing shear forces at a divergence point associated with the nozzle.

Figure 2:
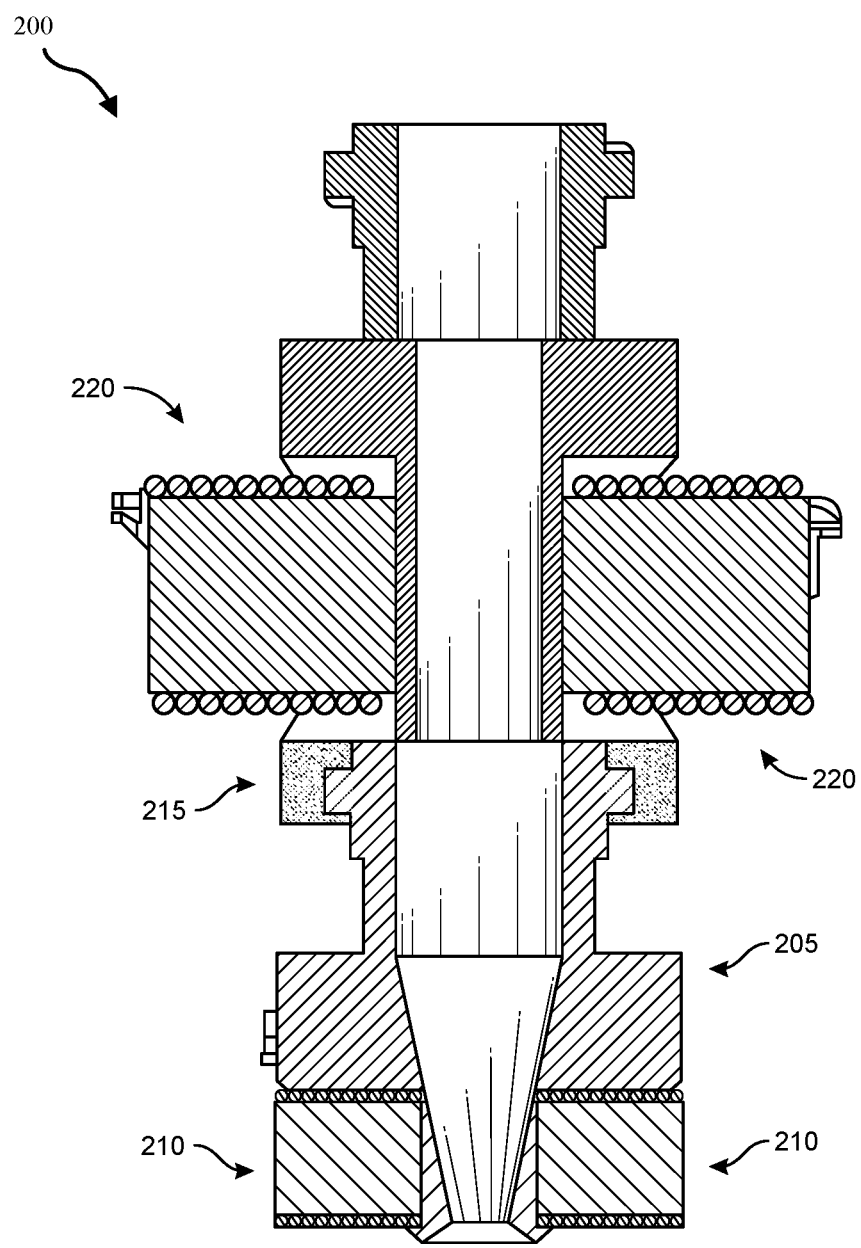
FIG. 2 illustrates an exemplary divergent nozzle design utilized in additive manufacturing of nanocomposites, according to an example embodiment.
Figure 3A:
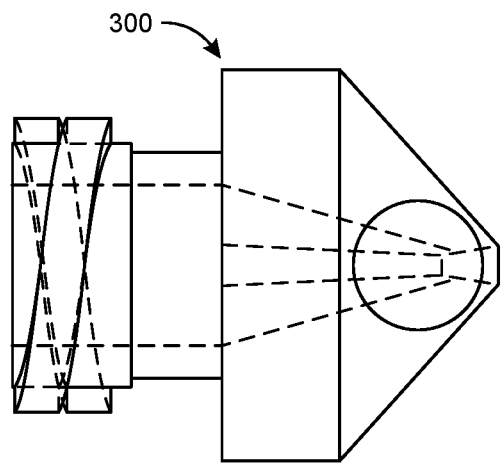
FIG. 3A illustrates a side view of an exemplary printhead apparatus based on a divergent nozzle design utilized in additive manufacturing of nanocomposites, according to an example embodiment.
Figure 3B:
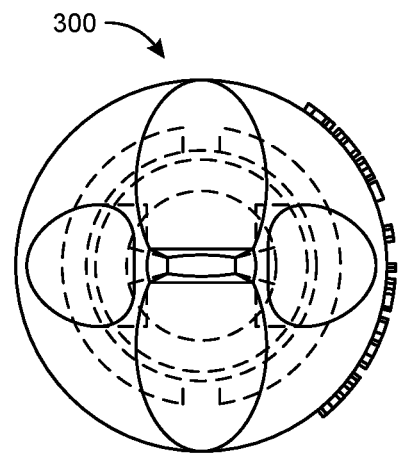
FIG. 3B illustrates a front view of an exemplary printhead apparatus based on a divergent nozzle design utilized in additive manufacturing of nanocomposites, according to an example embodiment.
Figure 3C:
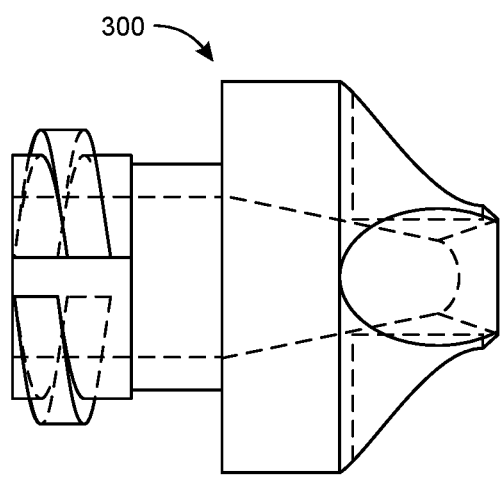
FIG. 3C illustrates another side view of an exemplary printhead apparatus based on a divergent nozzle design utilized in additive manufacturing of nanocomposites, according to an example embodiment.
Figure 3D:
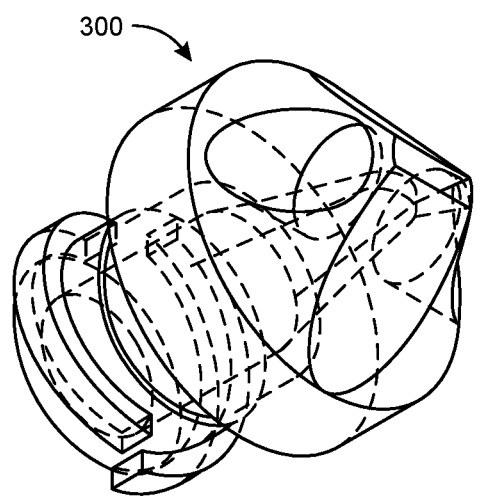
FIG. 3D illustrates an isometric view of an exemplary printhead apparatus based on a divergent nozzle design utilized in additive manufacturing of nanocomposites, according to an example embodiment.

FIG. 2 illustrates an exemplary divergent nozzle design 200 utilized in additive manufacturing of nanocomposites, according to an example embodiment. In some embodiments, the divergent nozzle design 200 may be utilized to construct a printhead apparatus for fluid and plastic-based extrusion during additive manufacturing. An example printhead apparatus 300 based on divergent nozzle design 200 is shown in FIG. 3A (i.e., a side view of printhead apparatus 300, FIG. 3B (i.e., a front view of printhead apparatus 300), FIG. 3C (i.e., another side view of printhead apparatus 300), and FIG. 3D (i.e., an isometric view of printhead apparatus 300. In one embodiment, printhead apparatus 300 may be constructed using a combination of metallic and plastic components.

Returning now to FIG. 2, in some examples, divergent nozzle design 200 may include a primary slotted/divergent nozzle (i.e., divergent nozzle 205), a secondary magnetic device 210, a connecting member 215, and a primary magnetic device 220.

In some examples, divergent nozzle 205 may be a variable angled nozzle that provides rotational forces for an alignment of particles during an additive manufacturing process at a variety of geometric angles including a 15-degree angle, a 30-degree angle, or a 45-degree angle. In some examples, these angles (i.e., the nozzle geometry) may allow for the depositing of more material, thereby increasing a surface area for the bonding of materials and increasing the integrity of a 3D printing output.

In some examples, the primary magnetic device 220 may form an upper housing of divergent nozzle design 200 and provide an initial alignment of magnetic particles utilized in magnetic inks during the additive manufacturing process. Additionally, secondary magnetic device 210 may form a lower housing of divergent nozzle design 200 and provide a secondary (e.g., final) magnetic field alignment of magnetic particles in the magnetic inks during the additive manufacturing process. In some examples, the primary magnetic device 220 and the secondary magnetic device 210 may each include pairs of permanent or electromagnets for providing the initial particle alignment and the secondary (or final) magnetic field alignment of the magnetic particles. In some examples, the pairs of magnets may be capable of generating an 80 mT magnetic field. In some examples, the magnetic field may act on a magnetic additive (e.g., iron oxide, nickel nanowires, ferromagnetic or paramagnetic material) added to polymer material utilized in additive manufacturing. In some embodiments, connecting member 215 may be a Luer lock body apparatus serving as a joint connection a printhead apparatus based on divergent nozzle design 200.

Any process parameters and sequence of steps described and/or illustrated herein are given by way of example only and can be varied as desired. For example, while steps illustrated and/or described herein may be shown or discussed in a particular order, these steps do not necessarily need to be performed in the order illustrated or discussed. Additionally, any exemplary methods described and/or illustrated herein may also omit one or more of steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A testbed platform for characterizing materials and inks utilized in additive manufacturing of nanocomposites comprising:
    a base comprising a top surface, a bottom surface, and a pair of opposing sidewalls, at least a portion of the top surface and the bottom surface forming an aperture that receives light rays;
    a plurality of electromagnets coupled to the opposing sidewalls of the base;
    a microscope slide seated in the aperture formed by the top surface and the bottom surface of the base;
    an interchangeable channel comprising a microfluidic flow cell coupled to the microscope slide;
    a plurality of needle tips in fluidic communication with the microfluidic flow cell, wherein a first needle tip in the plurality of needle tips is coupled to a syringe inlet via a lock connector and is configured to receive magnetic inks utilized in additive manufacturing from a syringe for dispensing into the microfluidic flow cell and wherein a second needle tip in the plurality of needle tips is coupled to a syringe outlet via another lock connector and is configured to pull the magnetic inks from the microfluidic flow cell into a reservoir;

an inverted microscope lens in optical communication with the base, the microscope slide, and the microfluidic flow cell; and a high-speed camera coupled to the inverted microscope lens, wherein the high-speed camera is utilized to capture one or more images of a flow behavior of the magnetic inks dispensed into the microfluidic flow cell for performing an analysis that determines an optimal nozzle design for microdispensing the magnetic inks during an additive manufacturing process.

2. The testbed platform of claim 1, wherein the interchangeable channel comprising the microfluidic flow cell has a 15-degree divergence angle.

3. The testbed platform of claim 1, wherein the interchangeable channel comprising the microfluidic flow cell has a 30-degree divergence angle.

4. The testbed platform of claim 1, wherein the interchangeable channel comprising the microfluidic flow cell has a 45-degree divergence angle.

5. The testbed platform of claim 1, wherein the interchangeable channel comprising the microfluidic flow cell is formed from a silicone-based organic polymer.

6. The testbed platform of claim 1, wherein the magnetic inks comprise thermoset composite inks.

7. The testbed platform of claim 6, wherein the thermoset composite inks are loaded with magnetic nanoparticles.

8. The testbed platform of claim 7, wherein the electromagnets have a variable field strength and apply an external magnetic field to the magnetic nanoparticles.

9. The testbed platform of claim 1, wherein the analysis that determines the optimal nozzle design for microdispensing the magnetic inks during an additive manufacturing process comprises determining one or more of a flowrate, pressure, and a magnetic nanoparticle alignment in a flow of the magnetic inks dispensed into the microfluidic flow cell.

10. The testbed platform of claim 1, wherein the analysis that determines the optimal nozzle design for microdispensing the magnetic inks during an additive manufacturing process comprises performing a fast Fourier transform image analysis to determine a degree of orientation magnetic nanoparticles in flow of the magnetic inks dispensed into the microfluidic flow cell.

11. The testbed platform of claim 1, wherein the analysis that determines the optimal nozzle design for microdispensing the magnetic inks during an additive manufacturing process comprises capturing one or more images showing a response of magnetic nanoparticles to a magnetic field applied by the electromagnets during a flow of the magnetic inks into the microfluidic flow cell.

12. The testbed platform of claim 11, wherein the response of the magnetic nanoparticles to the magnetic field comprises at least one of a determination of vorticity and a determination of velocity.

13. The testbed platform of claim 1, wherein the optimal nozzle design for microdispensing the magnetic inks during the additive manufacturing process comprises a divergent nozzle design configured to control fiber orientation during the additive manufacturing process with a composite material, thereby reducing shear forces at a divergence point associated with the nozzle.

14. A system for characterizing materials and inks utilized in additive manufacturing of nanocomposites comprising:

a testbed platform comprising:
a base comprising a top surface, a bottom surface, and a pair of opposing sidewalls, at least a portion of the top surface and the bottom surface forming an aperture that receives light rays;
a plurality of electromagnets coupled to the opposing sidewalls of the base;
a microscope slide seated in the aperture formed by the top surface and the bottom surface of the base;
an interchangeable channel comprising a microfluidic flow cell coupled to the microscope slide;
a plurality of needle tips in fluidic communication with the microfluidic flow cell, wherein a first needle tip in the plurality of needle tips is coupled to a syringe inlet via a lock connector and is configured to receive magnetic inks utilized in additive manufacturing from a syringe for dispensing into the microfluidic flow cell and wherein a second needle tip in the plurality of needle tips is coupled to a syringe outlet via another lock connector and is configured to pull the magnetic inks from the microfluidic flow cell into a reservoir;
an inverted microscope lens in optical communication with the base, the microscope slide, and the microfluidic flow cell; and
a high-speed camera coupled to the inverted microscope lens, wherein the high-speed camera is utilized to capture one or more images of a flow behavior of the magnetic inks dispensed into the microfluidic flow cell for performing an analysis that determines an optimal nozzle design for microdispensing the magnetic inks during an additive manufacturing process; and a divergent nozzle apparatus, based on the optimal nozzle design, the divergent nozzle comprising:
a variable angled nozzle that provides rotational forces for an alignment of particles during the additive manufacturing process;
a primary magnetic device that provides an initial alignment of magnetic particles in the magnetic inks during the additive manufacturing process;
a secondary magnetic device, coupled to the variable angled nozzle, that provides a secondary alignment of magnetic particles in the magnetic inks during the additive manufacturing process; and
a connecting member that connects a housing comprising the primary magnetic device to a housing comprising the variable angled nozzle.

15. The system of claim 14, wherein the variable angled nozzle comprises at least one of a 15-degree angle, a 30-degree angle, or a 45-degree angle.

16. The system of claim 14, wherein the primary magnetic device comprises one or more permanent magnets.

17. The system of claim 14, wherein the primary magnetic device comprises one or more electromagnets.

18. The system of claim 14, wherein the secondary magnetic device comprises one or more permanent magnets.

19. The system of claim 14, wherein the secondary magnetic device comprises one or more electromagnets.

* * * * *